Patented May 19, 1953

2,639,231

UNITED STATES PATENT OFFICE

2,639,231

FERTILIZER PROCESS AND PRODUCT

Ernest A. Snow, Jr., Amherst, Mass.

No Drawing. Application March 28, 1952,
Serial No. 279,219

2 Claims. (Cl. 71—13)

This invention relates to fertilizers and more particularly to a mixed fertilizer process and product.

Mixed fertilizers are those comprising mixtures of two or more fertilizer materials. An increasingly important class of these mixed fertilizers is that termed or understood as "complete" fertilizers, and characterized heretofore by varying guaranteed percentages of the three plant nutrients, nitrogen, phosphoric acid and potash. The manufacture of these "complete" fertilizers may generally be described as the assembling, pulverizing, acidulating and blending of fertilizer ingredients and materials providing the mentioned primary essential plant nutrients. Since the inception of the manufacture of mixed fertilizers for commercial purposes the availability and selection of these raw materials has undergone radical change due to the exhaustion of sources of supply, their preemption for military uses and the like, compelling the interruption of or substantial change in the manufacturing process. The compounding with these nutrient materials of a very large percentage of make-weight material of substantially no value to the plant remains, however, an inherent characteristic of the described complete fertilizer manufacture.

More recently it has been shown that for most soils and crops complete fertilizers should carry the secondary essential elements in addition to the primary plant nutrients above mentioned, comprising, in other words, the six elements, nitrogen, phosphorus, potassium, calcium, sulfur and magnesium. In addition, it has been established that a third group of elements, including iron, manganese, boron, copper, zinc and molybdenum, while helpful in most cases only in trace quantities, or concentrations of the order of one-fourth part per million, are nonetheless essential to normal healthy plant growth. The manufacture of complete fertilizers has recently been influenced also by greater emphasis on their secondary function of soil conditioning, or more particularly aeration, moisture retention, and the like.

Two widely distributed, practically inexhaustible but little used sources of these nutrient and soil conditioning values are sea water and sewage sludge. Sea water is known to contain appreciable quantities of the minerals calcium, magnesium and potassium, and measurable amounts of the secondary and rarer essential elements as well. Further, it is recognized that sewage sludge is a carrier of a variety of growth-promoting substances, including substantially all of the essential elements above mentioned. Sludges are valued also for their soil building humus and inert content, particularly in areas where soils are deficient in organic matter and moisture-holding capacity. However, methods previously developed for extracting the primary element potassium from sea water have been for the most part physical, as by evaporation, and have proven impractical, at least for fertilizer purposes.

And while various forms of sewage sludge have been used in isolated areas and on a limited scale, sea water and sewage sludge have generally been regarded as impractical and unprofitable raw materials for mixed fertilizers, so that they remain substantially untapped sources of fertilizer values.

This invention aims to provide a fertilizer process and product utilizing these abundant, largely wasted sources to yield a base for commercial mixed fertilizers comprised substantially entirely of fertilizer values and incorporating the primary, secondary and substantially all of the trace or rarer essential elements. The invention aims further to provide a fertilizer base in which the nutrients are in a form available to the plants, and having physical characteristics beneficial to the soil.

In the first phase of the invention process, the potassium, calcium, and magnesium and also the secondary and rarer essential elements present in the sea water are extracted or more particularly precipitated as a salt. In addition, the desired initial reaction and the nutrient content of and balance in the reaction product, the sea water precipitate, are furthered by the addition of an ammonium ion. I have determined further that by the use in combination with the ammonium ion of a soluble ferrocyanide both the calcium and magnesium ions, as well as the potassium ions may be precipitated out in a single operation.

Accordingly ten (10) parts (more or less, according to solubility) by weight as of a soluble ferrocyanide and fifteen (15) parts (more or less) by weight of ammonium chloride are dissolved in one thousand (1000) parts by weight of the sea water, according to the equations

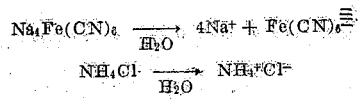

The nutrient ions $Ca^{++}$, $Mg^{++}$, $K^+$, and $NH_4^+$ are seen to be present in the solution; they may be graphed for the purposes of illustrating the precipitate reaction with the ferrocyanide as follows:

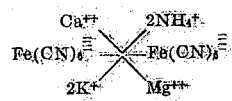

I have found that the addition of alcohol tends to depress the solubility of the ingredients and also to accelerate the contact of the ions. Accordingly fifty (50) or more parts by weight of any low boiling point alcohol, or alcohol-containing still waste, or acetone, are stirred in to yield the milky precipitate. The reactions are complex, but may be represented for the purposes of the invention in the following manner:

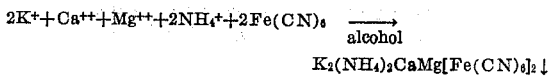

As above described and illustrated, in the first phase of the invention process the valuable potassium, calcium and magnesium content of the sea water is separated out by combination with a cyanide ion, and an ammonium ion is added to effect a nutrient ion pairing for such sea water precipitate forming combination and also to furnish a portion of the nitrogen ultimately present in the complete fertilizer base. Qualitative analyses of the precipitate have shown it to contain substantial amounts of potassium, calcium, magnesium, and of course iron, as indicated by the foregoing, and to carry trace quantities also of copper and zinc.

In the succeeding process step the precipitate is separated from the brine in any desired manner as by centrifuging or filtering and, optionally, washing. The extent to which removal of the salt is necessary will of course depend upon the soil or crop to which the fertilizer base is to be applied. The precipitate is then oven dried at 105° C., more or less, ground, and stored for the next operation.

In the following phase of the invention process, the nutrient values of the precipitate and of sewage sludge are combined and the cyanide, which is seen to render the precipitate poisonous to plants, is either driven off or converted to desired nutrient values. More particularly, two to fifteen (2-15) parts by weight of the precipitate and two to five (2-5) parts by weight of dried sewage sludge are combined with or digested in say fifty (50) parts by weight of concentrated sulfuric acid, and heated from one to two hours in an acid-resistant still until the liquor is clear. The reactions important to the invention may be represented as follows:

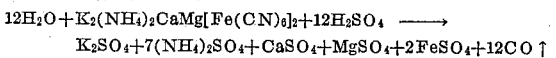

It will be apparent that substantially all of the nitrogen and a like or lesser fraction of the other nutrients contained in the sludge combined in this step are converted to a form available to the plant. It will be readily appreciated also that the deleterious ferrocyanide ions of the precipitate are thus converted to a gas, carbon monoxide, and useful soluble ferrous and ammonium ions.

The steps and reactions thus far described and illustrated are seen to provide for the fertilizer base valuble fractions of the primary nutrients nitrogen and potassium. The phosphorus content is now brought to the desired level by the addition of ten to forty (10-40) parts of ground rock phosphate, or of any ground rock of sufficient phosphatic content, which is seen to be rendered soluble by and to neutralize the acid excess in the liquor produced by the preceding reaction. It will be readily appreciated by those skilled in the art that the desired phosphate content is incorporated into the fertilizer base by combining ground rock phosphate with an acid mixture, as herein described, substantially more cheaply than by adding super-phosphate already compounded as such.

In the final phase of the invention process, the mixed fertilizer base is enhanced by additions giving it the physical form and soil-building values herein before mentioned as desirable for a superior mixed fertilizer. More particularly twenty-five to thirty (25-30) parts, more or less, by weight of dried sewage sludge are added, slowly, and in the presence of heat, and the resultant final product is evaporated to dryness. It may then be ground and packaged in known manner. It will be appreciated that this later sludge addition provides the humus, organic and other soil-building values desired for the fertilizer base. It will be understood also that the sludge nutrients including the trace elements are appreciably solubilized thereby. Quantitative analyses of the complete product have shown it to contain amounts of calcium, iron, boron, and aluminum, as well as phosphorus measurably greater than the precipitate derived in the first phase of the process.

It will be understood further that the invention is illuminated but not limited by the combining proportions and ranges of proportions recited herein. Similarly, the chemical analysis of the mixed or complete fertilizer base may vary widely in the practice of the invention as desired for or as required by the crop and/or soil to which it is to be applied. It will be appreciated also that the percentage content of one or more of the primary nutrients, particularly potash, may later and elsewhere be increased by the manufacturer, as for a different or greater primary nutrient content in the commercial mixed fertilizer to be compounded from the base; or by the farmer or other base purchaser or user, as desired or preferred for a given crop or soil condition. In other words, the nutrient content resultant in the base from the process weights, strengths, and proportions specified herein may vary and more particularly be deficient or excessive as to one or more of the essential elements and as contrasted with the content indicated for any given application. It is contemplated therefore that where a high analysis fertilizer is to be employed the relatively large primary nutrient content indicated for the mixture as applied or broadcast may generally and readily be effected by the addition of appropriate amounts of nitrogen, phosphoric acid, and/or potash in the manner and form desired.

It will be apparent from the foregoing that the present invention novelly combines the nutrient and soil-building values from sea water and sewage sludge according to a simple and economical process and producing a complete fertilizer base containing the primary, secondary and trace essential elements in significant amounts and in a form available to the plants. It will be understood further that the complete fertilizer product of the invention is comprised substantially entirely of the mentioned nutrient and soil-building values and is relatively free of inert and other carrier materials of no value to the plant.

It will be understood that my invention, either as to product or method, is not limited to the exemplary embodiments or steps herein illustrated or described, and I set forth its scope in my following claims:

1. The method of making a complete fertilizer base containing in available form the primary, secondary and also the trace elements essential to plant growth which comprises combining relatively small weights of ammonium chloride and a soluble ferrocyanide with a relatively large weight of sea water and in the presence of a reaction inducing weight of alcohol to derive a precipitate; separating, drying and grinding said precipitate; combining the precipitate with an equal or lesser weight of sewage sludge and in the presence of a sludge digesting weight of concentrated sulfuric acid; combining with the precipitate and sludge a similar acid neutralizing weight of a ground phosphate; adding thereto a relatively larger weight of dried sewage sludge; and drying and grinding the final product.

2. A mixed fertilizer base comprising primary, secondary and rarer essential element nutrients precipitated from sea water, nitrogen solubilized from ammonia bearing salts, nitrogeneous and divers mineral nutrients extracted from acid digested sewage sludge, soluble phosphate, and physically admixed dried sewage sludge, said mixed base constituting a complete fertilizer including useful quantities of substantially all of the essential elements in a form available to the plant and having also a physical form and chemical content beneficial to the soil.

ERNEST A. SNOW, Jr.

References Cited in the file of this patent

UNITED STATES PATENTS

| Number | Name | Date |
|---|---|---|
| 280,320 | Menard | June 26, 1883 |
| 517,486 | Schenck | Apr. 3, 1894 |
| 1,228,587 | Nash | June 5, 1917 |

FOREIGN PATENTS

| Number | Country | Date |
|---|---|---|
| 1,579 | Great Britain | July 5, 1856 |
| 8,931 | Great Britain | Apr. 21, 1903 |

OTHER REFERENCES

Bruttini, Uses of Waste Materials, 1923, King and Son Ltd., Westminster, Eng. (pages 206–307).